(12) United States Patent
Benco et al.

(10) Patent No.: US 8,613,555 B2
(45) Date of Patent: Dec. 24, 2013

(54) COMPOSITE METAL-POLYMER BUSHING AND CRANKSHAFT ASSEMBLY

(75) Inventors: Michael G. Benco, Onalaska, WI (US); William E. Lapp, La Crosse, WI (US); Derrick J. Lepak, La Crosse, WI (US); Arther L. Butterworth, La Crosse, WI (US); David Janda, Onalaska, WI (US); Dennis R. Dorman, La Crosse, WI (US)

(73) Assignee: Trane International Inc., Piscataway, NJ (US)

( * ) Notice: Subject to any disclaimer, the term of this patent is extended or adjusted under 35 U.S.C. 154(b) by 253 days.

(21) Appl. No.: 13/103,793

(22) Filed: May 9, 2011

(65) Prior Publication Data

US 2012/0288392 A1 Nov. 15, 2012

(51) Int. Cl.
*F16C 9/02* (2006.01)
*B21D 53/00* (2006.01)

(52) U.S. Cl.
USPC .................. 384/294; 384/300; 29/898.054

(58) Field of Classification Search
USPC ................ 384/276, 279, 286–289, 294, 300; 29/451, 888.08, 898.054
See application file for complete search history.

(56) References Cited

U.S. PATENT DOCUMENTS

| | | | |
|---|---|---|---|
| 3,342,667 A * | 9/1967 | Berlinghof, Jr. | 384/297 |
| 3,416,941 A | 12/1968 | Mizuno | |
| 3,632,459 A * | 1/1972 | Klauer | 384/276 |
| 4,189,522 A | 2/1980 | Mori | |
| 4,208,472 A | 6/1980 | Cho et al. | |
| 4,308,153 A | 12/1981 | Mori | |
| 4,582,368 A | 4/1986 | Fujita et al. | |
| 4,865,467 A | 9/1989 | Becker et al. | |
| 6,082,495 A | 7/2000 | Steinbarger et al. | |
| 6,416,851 B1 | 7/2002 | Kuroiwa et al. | |
| 6,607,820 B2 * | 8/2003 | Niwa et al. | 384/908 |
| 6,802,650 B2 * | 10/2004 | Yasuda et al. | 384/276 |
| 2008/0025861 A1 | 1/2008 | Okawa et al. | |
| 2010/0086426 A1 | 4/2010 | Ohkawa et al. | |

FOREIGN PATENT DOCUMENTS

| | | |
|---|---|---|
| CN | 101027486 | 8/2007 |
| DE | 3414095 | 1/1985 |
| EP | 1803939 | 7/2007 |
| EP | 1845261 | 10/2007 |

(Continued)

OTHER PUBLICATIONS

International Search Report and Written Opinion for Application No. PCT/US2012/036510 dated Nov. 9, 2012 (7 pages).

*Primary Examiner* — James Pilkington
(74) *Attorney, Agent, or Firm* — Michael Best & Friedrich LLP

(57) ABSTRACT

An assembly includes a composite metal-polymer bushing having an outer metal layer with an inner surface, metal particles sintered to the inner surface, a polymer material between the metal particles, a finished interior surface collectively defined by the polymer material and exposed portions of the metal particles, a plurality of interstices formed between the metal particles and the polymer material, and a plurality of ridges defined by the polymer material that protrude above the metal particles. The ridges occupy at least about 8% of the area of a cylindrical reference surface nominally coinciding with the finished interior surface. The assembly also includes a crankshaft having a journal at least partially received within the bushing and supported by the finished interior surface. The journal is polished to a surface finish of about 0.1 microns or less to reduce a wear rate of the bushing.

23 Claims, 4 Drawing Sheets

(56) References Cited

FOREIGN PATENT DOCUMENTS

| | | |
|---|---|---|
| JP | 62200018 | 9/1987 |
| JP | 3003988 | 1/1991 |
| JP | 3194210 | 8/1991 |
| JP | 5098315 | 4/1993 |
| JP | 2005133657 | 5/2005 |
| JP | 2006090330 | 4/2006 |
| JP | 2006132540 | 5/2006 |
| WO | 2009017501 | 2/2009 |
| WO | 2010091083 | 8/2010 |

* cited by examiner

COMPOSITE METAL-POLYMER BUSHING AND CRANKSHAFT ASSEMBLY

FIELD OF THE INVENTION

The present invention relates to compressors, and more particularly to bushing and crankshaft assemblies for use in compressors.

BACKGROUND OF THE INVENTION

Hermetic refrigerant scroll compressors include crankshafts typically rotatably supported by bushings. Following shut-down, the refrigerant in the scroll compressors can behave as a "degreaser" and remove residual lubricant situated on the crankshaft and/or bushings. Then, when re-starting the compressor, little or no residual lubricant may be available to the bushings and the crankshaft until additional lubricant is pumped to the bushings and the crankshaft. Consequently, undesirably high frictional forces may develop between the crankshaft and the bushings, potentially causing excess wear and/or galling of the bushing, and possibly reducing the usable life of the bushing.

SUMMARY OF THE INVENTION

The present invention provides, in one aspect, an assembly including a composite metal-polymer bushing having an outer metal layer with an inner surface, metal particles sintered to the inner surface, a polymer material between the metal particles, a finished interior surface collectively defined by the polymer material and exposed portions of the metal particles, a plurality of interstices formed between the metal particles and the polymer material, and a plurality of ridges defined by the polymer material that protrude above the metal particles. The ridges occupy at least about 8% of the area of a cylindrical reference surface nominally coinciding with the finished interior surface. The assembly also includes a crankshaft having a journal at least partially received within the bushing and supported by the finished interior surface. The journal is polished to a surface finish of about 0.1 microns or less to reduce a wear rate of the bushing.

The present invention provides, in another aspect, a method of assembling a composite metal-polymer bushing and a crankshaft. The bushing includes an outer metal layer, metal particles sintered to an inner surface of the outer metal layer, and a polymer material between the metal particles. The method includes boring an interior surface of the bushing to at least partially expose the metal particles, thereby forming a finished interior surface collectively defined by the polymer material and exposed portions of the metal particles, forming ridges with the polymer material that protrude above the metal particles following the boring step and that occupy at least about 8% of the area of a cylindrical reference surface nominally coinciding with the finished interior surface, polishing a journal of the crankshaft to a surface finish of about 0.1 microns or less, inserting the polished journal into the bushing, and supporting the journal with the finished interior surface of the bushing.

The present invention provides, in yet another aspect, a method of assembling a compressor. The method includes providing a composite metal-polymer bushing and a crankshaft. The bushing includes an outer metal layer, metal particles sintered to an inner surface of the outer metal layer, and a polymer material between the metal particles. The method also includes boring an interior surface of the bushing to at least partially expose the metal particles, thereby forming a finished interior surface collectively defined by the polymer material and exposed portions of the metal particles, forming ridges with the polymer material that protrude above the metal particles following the boring step and that occupy at least about 8% of the area of a cylindrical reference surface nominally coinciding with the finished interior surface, polishing a journal of the crankshaft to a surface finish of about 0.1 microns or less, inserting the polished journal into the bushing, supporting the journal with the finished interior surface of the bushing, and positioning the bushing and the crankshaft within a housing of the compressor.

The present invention provides, in a further aspect, a method of assembling a compressor. The method includes providing a composite metal-polymer bushing and a crankshaft. The bushing includes an outer metal layer, metal particles sintered to an inner surface of the outer metal layer, a polymer material between the metal particles, and a plurality of interstices formed between the metal particles and the polymer material. The method also includes boring an interior surface of the bushing to at least partially expose the metal particles and at least some of the interstices to the finished interior surface, thereby forming a finished interior surface collectively defined by the polymer material and exposed portions of the metal particles, applying lubricant to one of the finished interior surface and a journal of the crankshaft, inserting the journal into the bushing, supporting the journal with the finished interior surface of the bushing, positioning the bushing and the crankshaft within a housing of the compressor, rotating the crankshaft journal relative to the bushing after the application of lubricant to one of the finished interior surface and the journal, and using hydrodynamic pressure developed between the journal and the bearing to at least partially fill the interstices with lubricant.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
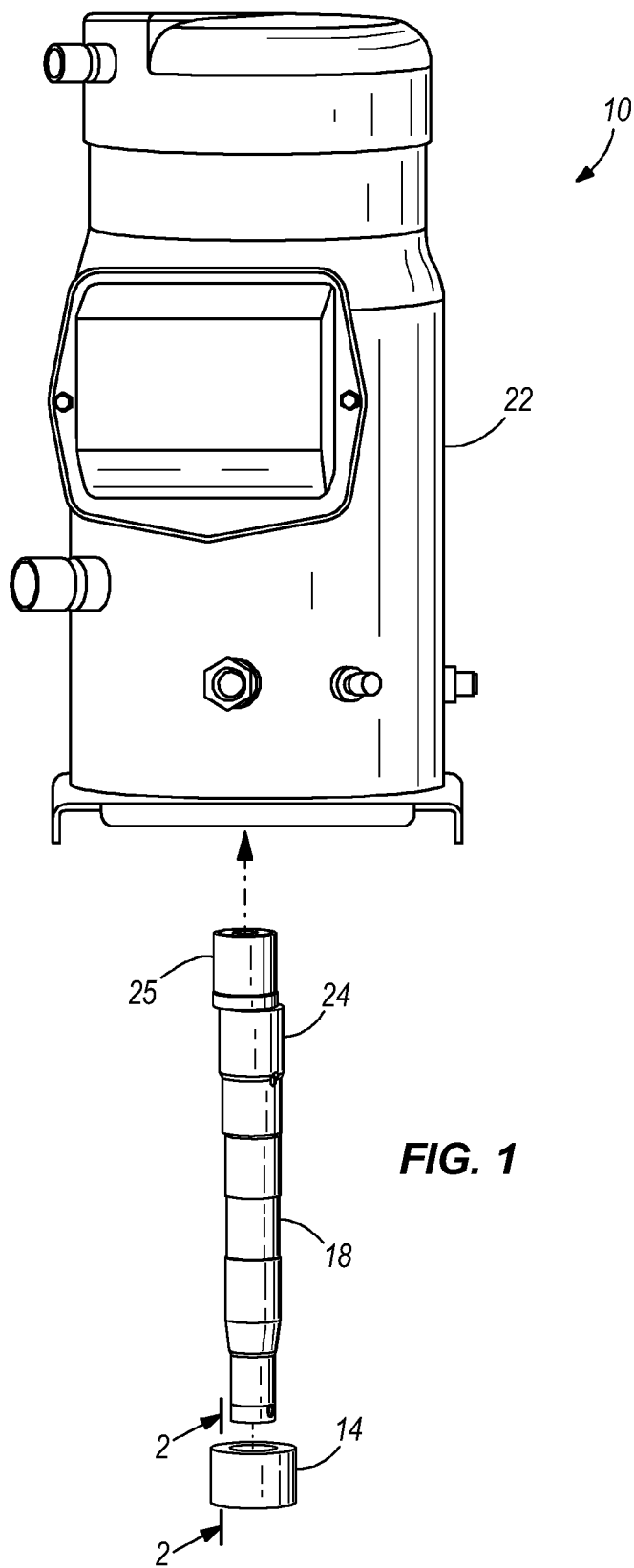
FIG. 1 is a front perspective view of an assembly of the present invention including a composite metal-polymer bushing, a crankshaft, and a compressor in which the bushing and crankshaft are incorporated.

FIG. 1 illustrates an assembly 10 including a composite metal-polymer bushing 14, a crankshaft 18, and a compressor 22 in which the bushing 14 and the crankshaft 18 are incorporated. The crankshaft includes at least one journal 24 that is received within and rotatably supported by the bushing 14. The compressor 22 is configured as a hermetic refrigerant scroll compressor 22 including a movable scroll (not shown) driven in an orbiting manner by an eccentric 25 on the crankshaft 18 relative to a fixed scroll (also not shown). In addition to the bushing 14 being positioned on the journal 24, a substantially identical bushing (not shown) may be positioned between the eccentric 25 and the movable scroll. Alternatively, the compressor 22 may be configured in any of a number of different ways for pumping refrigerant or any other substance.

Figure 2:
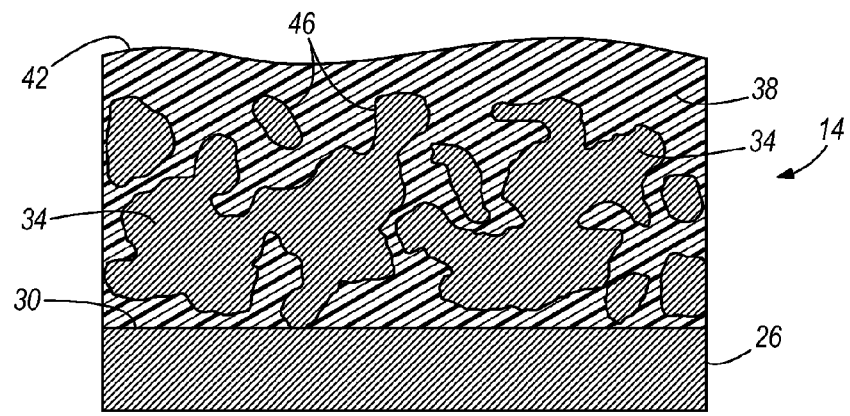
FIG. 2 is an enlarged, cross-sectional view through a portion of the bushing of FIG. 1 prior to a machining process in which a portion of the interior of the bushing is removed.

With reference to FIG. 2, the bushing 14 includes an outer metal layer 26 having an inner surface 30, metal particles 34 (e.g., bronze, aluminum, etc.) sintered to the inner surface 30, and a low-friction polymer material 38 positioned between the metal particles 34. Such a bushing 14 is commercially available from Daido Metal Company Ltd. of Tokyo, Japan under model number DDK 55. The polymer material 38 may include only a single polymer (e.g., polytetrafluoroethylene), or the polymer material 38 may include a blend of two or more different polymers. In its original state, the bushing 14 includes an unfinished interior surface 42 defined entirely by the polymer material 38. As such, the polymer material 38 surrounds and overlies the metal particles 34, thereby defining a plurality of voids or interstices 46 between the metal particles 34 and the polymer material 38.

Figure 3:
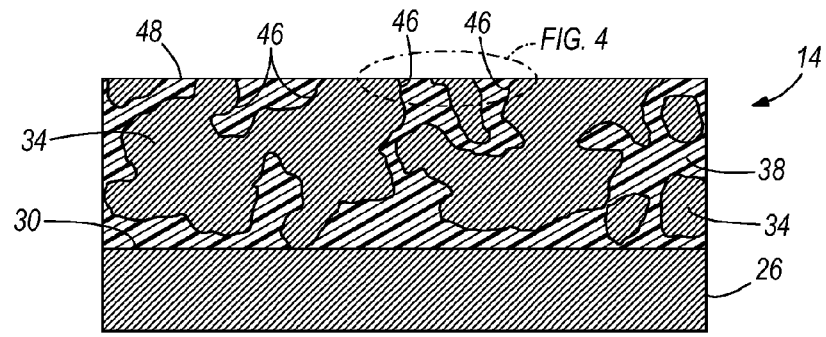
FIG. 3 is an enlarged, cross-sectional view through a portion of the bushing of FIG. 1 subsequent to a machining process in which a portion of the interior of the bushing is removed.

Prior to incorporating the bushing 14 and the crankshaft 18 into the compressor 22, the bushing 14 is first machined to at least partially expose the metal particles 34, thereby forming a finished interior surface 48 collectively defined by the polymer material 38 and exposed portions of the metal particles 34 (FIG. 3). Particularly, a boring process is used to machine or bore the unfinished interior surface 42 of the bushing 14 to expose the metal particles 34. The boring process may be implemented using a lathe, in which the bushing 14 is secured in a spindle that is rotatable relative to a cutting tool (e.g., a single-point cutting tool, etc.), and in which the cutting tool is axially displaceable relative to the bushing 14 to perform the boring operation.

Figure 4:
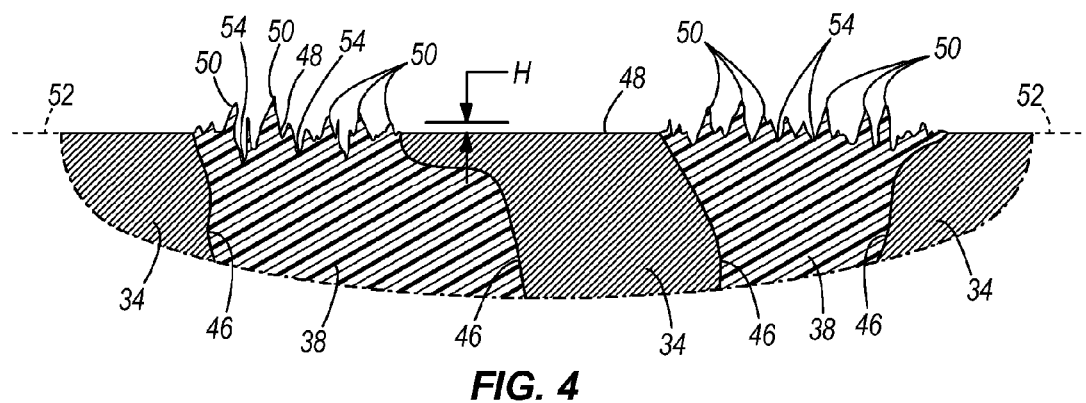
FIG. 4 is an enlarged view of the portion of the bushing shown in FIG. 3, illustrating a finished interior surface on the bushing.

The inventors have discovered that implementing the boring process (e.g., when using a lathe) under certain conditions forms ridges 50 with the polymer material 38 that protrude above the metal particles 34 and that occupy at least about 8% of the area of a cylindrical reference surface 52 nominally coincident with the finished interior surface 48 (FIG. 4). Ideally, substantially all of the polymer material 38 on the finished interior surface 48 would protrude above the metal particles 34. However, due to the nature of the boring process, a plurality of valleys 54 defined by the polymer material 38 on the finished interior surface 48 are also created. The ridges 50 are effective as a source of solid lubricant between the crankshaft journal 24 and the bushing 14 that cannot be removed by the degreasing effect of refrigerant within the compressor 22. Preferably, the ridges 50 include a height H of at least about 10 microns measuring from the cylindrical reference surface 52.

For example, the inventors have discovered that displacing the cutting tool toward the bushing 14 at a feed rate between about 0.0028 and about 0.0056 inches per revolution of the bushing 14 contributes to the formation of the ridges 50. The inventors have also discovered that rotating the bushing 14 in a lathe at a rotational speed between about 500 and about 1760 revolutions per minute of the spindle also contributes to the formation of the ridges 50. Furthermore, the inventors have discovered that using a carbide insert or cutting tool as opposed to, for example, a diamond-tipped insert or cutting tool contributes to the formation of the ridges 50.

With continued reference to FIG. 4, at least some of the interstices 46 between the metal particles 34 and the polymer material 38 are exposed to the finished interior surface 48 and the valleys 54 at least partially define the finished interior surface 48. The significance of both of which is described in greater detail below.

Prior to incorporating the crankshaft 18 into the compressor 22, at least the journal 24 of the crankshaft 18 is polished to a surface finish ($R_a$) of about 0.1 microns or less to reduce the wear rate or galling of the bushing 14. Also, at least the journal 24 of the crankshaft 18 is hardened to a value at least about 55 HRC to inhibit embedment of foreign debris in the journal 24 during operation of the compressor 22.

Then, an initial amount of lubricant (e.g., grease or oil) is applied to the finished interior surface 48 of the bushing 14, which may or may not already be incorporated into the compressor 22, prior to inserting the polished and hardened journal 24 into the bushing 14. Alternatively, grease may be applied to the journal 24 or a combination of the finished interior surface 48 of the bushing 14 and the journal 24. When installed, the crankshaft journal 24 is supported by the finished interior surface 48 of the bushing 14.

Then, the compressor 22 is mounted to a test stand and is operated to rotate the crankshaft journal 24 relative to the bushing 14. The initial amount of lubricant applied to the bushing 14 and/or the crankshaft journal 24 is sufficient to lubricate the bushing 14 for a period of time until additional lubricant is provided by a lubricant pump within the compressor 22. Hydrodynamic pressure developed between the journal 24 and the bushing 14 at least partially fills or "pre-charges" the interstices 46 with lubricant, thereby forming a plurality of lubricant reservoirs within the bushing 14. In addition, the hydrodynamic pressure at least partially fills or pre-charges the valleys 54 in the polymer material 38 with lubricant, thereby forming an additional plurality of lubricant reservoirs within the bushing 14.

After the compressor 22 is shut down, residual lubricant between the bushing 14 and the crankshaft journal 24 may be removed or degreased by the refrigerant. However, the lubricant reservoirs within the interstices 46 and the valleys 54, respectively, are available for a subsequent restart of the compressor 22 to provide sufficient lubrication of the bushing 14 until a steady flow of lubricant is again provided by the lubricant pump in the compressor 22. Particularly, a sufficient amount of the stored lubricant may seep from the interstices 46 and/or the valleys 54 to provide lubricant between the rotating crankshaft journal 24 and the stationary bushing 14 until a steady flow of lubricant is provided by the lubricant pump in the compressor 22. The interstices 46 and the valleys 54 may then be refilled with lubricant by the hydrodynamic pressure developed between the journal 24 and the bushing 14 in preparation for a subsequent restart of the compressor 22.

In addition, as the crankshaft journal 24 begins to rotate in response to a subsequent restart of the compressor 22, the ridges 50 of the polymer material 38 are in contact with the journal 24 and are "smeared" onto the rotating journal 24 to impart some of the polymer material 38 to the journal 24. Therefore, the portion of the polymer material 38 that is smeared or imparted to the journal 24 functions as a solid lubricant to reduce the friction between the bushing 14 and the crankshaft journal 24 prior to establishment of a steady flow of lubricant to the bushing 14. Additional amounts of polymer material 38 may be smeared to the crankshaft journal 38 during each restart of the compressor 22 to inhibit wear or galling of the bushing 14 that might otherwise result in absence of the polymer material 38 and the lubricant seeping from the interstices 46 and/or the valleys 54.

Further amounts of the polymer material 38 may be smeared over the exposed metal particles 34, thereby fully covering or at least partially covering the individual metal particles 34. The portion of the metal particles 34 that are covered by the smeared polymer material 38 are inhibited from galling onto the crankshaft journal 24.

Figure 5A:
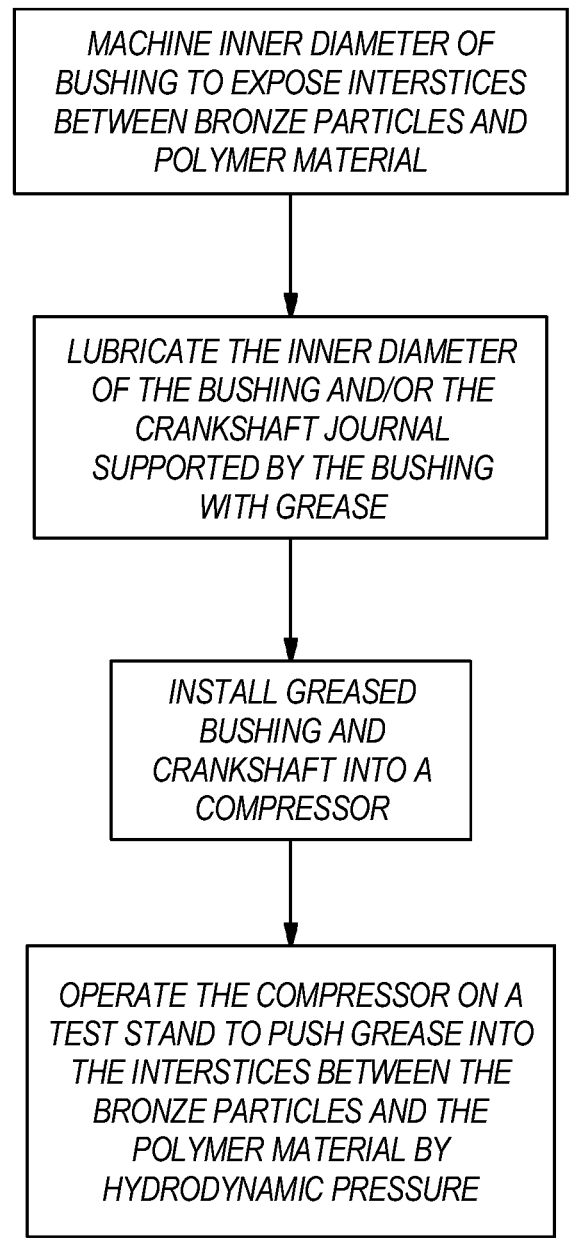
FIG. 5A is a flow chart illustrating a method of assembling the compressor of FIG. 1 using grease as a lubricant.
Figure 5B:
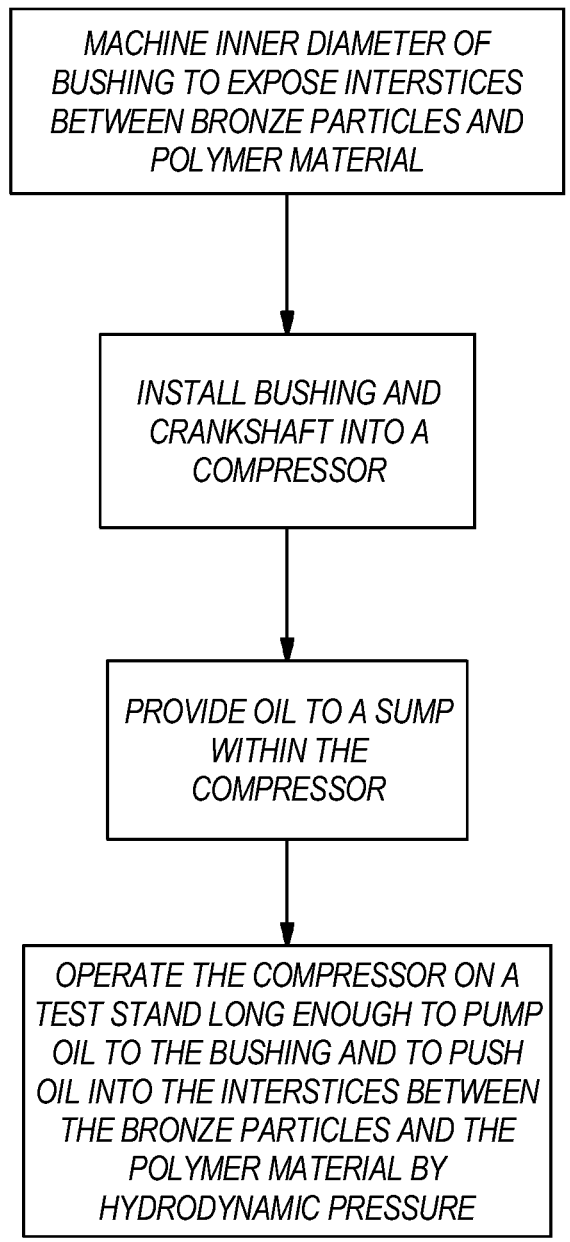
FIG. 5B is a flow chart illustrating a method of assembling the compressor of FIG. 1 using oil as a lubricant.

The above-described process for assembling the compressor 22, when using grease as the lubricant, is summarized in the flow chart provided in FIG. 5A of the drawings. Alternatively, the compressor 22 may be assembled using oil as the lubricant rather than grease, the process for which is shown in FIG. 5B. After the bushing 14 is machined and the crankshaft journal 24 is polished and hardened, the bushing 14 and the crankshaft 18 are installed into the compressor 22. Oil is then provided to a sump within the compressor 22. Lastly, the compressor 22 is operated on a test stand long enough to pump oil to the bushing 14 and to push oil into the interstices 46 and the valleys 54 by hydrodynamic pressure.

Various features of the invention are set forth in the following claims.

What is claimed is:

1. An assembly comprising:
    a composite metal-polymer bushing including
        an outer metal layer having an inner surface,
        metal particles sintered to the inner surface,
        a polymer material between the metal particles,
        a finished interior surface collectively defined by the polymer material and exposed portions of the metal particles,
        a plurality of interstices formed between the metal particles and the polymer material, and
        a plurality of ridges defined by the polymer material that protrude above the metal particles, the ridges occupying at least about 8% of the area of the finished interior surface; and
    a crankshaft including a journal at least partially received within the bushing and supported by the finished interior surface, wherein the journal is polished to a surface finish of about 0.1 microns or less to reduce a wear rate of the bushing.

2. The assembly of claim 1, wherein at least some of the interstices are exposed to the finished interior surface.

3. The assembly of claim 2, further comprising lubricant at least partially filling the interstices.

4. The assembly of claim 1, further comprising:
    a plurality of valleys defined by the polymer material on the finished interior surface, and
    lubricant at least partially filling the valleys.

5. The assembly of claim 1, wherein the polymer material includes polytetrafluoroethylene.

6. The assembly of claim 1, wherein the journal is hardened to at least about 55 HRC to inhibit embedment of foreign debris in the journal.

7. The assembly of claim 1, further comprising a hermetic refrigerant scroll compressor in which the crankshaft and the bushing are incorporated.

8. The assembly of claim 1, wherein the ridges protrude above the metal particles by at least about 10 microns.

9. A method of assembling a composite metal-polymer bushing and a crankshaft, the bushing including an outer metal layer, metal particles sintered to an inner surface of the outer metal layer, and a polymer material between the metal particles, the method comprising:
    boring an interior surface of the bushing to at least partially expose the metal particles, thereby forming a finished interior surface collectively defined by the polymer material and exposed portions of the metal particles, the boring forming ridges with the polymer material that protrude above the metal particles and occupy at least 8% of the area of the finished interior surface;
    polishing a journal of the crankshaft to a surface finish of about 0.1 microns or less;
    inserting the polished journal into the bushing; and
    supporting the journal with the finished interior surface of the bushing.

10. The method of claim 9, wherein the bushing further includes a plurality of interstices formed between the metal particles and the polymer material, and wherein the boring further includes exposing at least some of the interstices to the finished interior surface.

11. The method of claim 10, further comprising applying lubricant to one of the finished interior surface and the journal prior to inserting the polished journal into the bushing.

12. The method of claim 11, further comprising:
    rotating the crankshaft journal relative to the bushing after the application of lubricant to one of the finished interior surface and the journal; and
    using hydrodynamic pressure developed between the journal and the bearing to at least partially fill the interstices with lubricant.

13. The method of claim 11, wherein the boring further includes
    forming valleys with the polymer material on the finished interior surface, the method further comprising
    rotating the crankshaft journal relative to the bushing after the application of lubricant to one of the finished interior surface and the journal; and
    using hydrodynamic pressure developed between the journal and the bearing to at least partially fill the valleys with lubricant.

14. The method of claim 9, wherein the boring step includes
    rotating the bushing relative to a cutting tool, and
    displacing the cutting tool toward the bushing at a feed rate between about 0.0028 inches per revolution of the bushing and about 0.0056 inches per revolution of the bushing.

15. A method of assembling a compressor, the method comprising:
    providing a composite metal-polymer bushing and a crankshaft, the bushing including an outer metal layer, metal particles sintered to an inner surface of the outer metal layer, and a polymer material between the metal particles;
    boring an interior surface of the bushing to at least partially expose the metal particles, thereby forming a finished interior surface collectively defined by the polymer material and exposed portions of the metal particles, the boring forming ridges with the polymer material that protrude above the metal particles and occupy at least 8% of the area of the finished interior surface;
    polishing a journal of the crankshaft to a surface finish of about 0.1 microns or less;
    inserting the polished journal into the bushing;

supporting the journal with the finished interior surface of the bushing; and positioning the bushing and the crankshaft within a housing of the compressor.

16. The method of claim 15, wherein the bushing further includes a plurality of interstices formed between the metal particles and the polymer material, and wherein the boring further includes exposing at least some of the interstices to the finished interior surface.

17. The method of claim 16, further comprising applying lubricant to one of the finished interior surface and the journal prior to inserting the hardened journal into the bushing.

18. The method of claim 17, further comprising:

rotating the crankshaft journal relative to the bushing after the application of lubricant to one of the finished interior surface and the journal; and using hydrodynamic pressure developed between the journal and the bearing to at least partially fill the interstices with lubricant.

19. The method of claim 17, wherein the boring further includes forming valleys with the polymer material on the finished interior surface, the method further comprising rotating the crankshaft journal relative to the bushing after the application of lubricant to one of the finished interior surface and the journal; and using hydrodynamic pressure developed between the journal and the bearing to at least partially fill the valleys with lubricant.

20. The method of claim 15, wherein the boring step includes rotating the bushing relative to a cutting tool, and displacing the cutting tool toward the bushing at a feed rate between about 0.0028 inches per revolution of the bushing and about 0.0056 inches per revolution of the bushing.

21. A method of assembling a compressor, the method comprising:

providing a composite metal-polymer bushing and a crankshaft, the bushing including an outer metal layer, metal particles sintered to an inner surface of the outer metal layer, a polymer material between the metal particles, and a plurality of interstices formed between the metal particles and the polymer material;

boring an interior surface of the bushing to at least partially expose the metal particles and at least some of the interstices to the finished interior surface, thereby forming a finished interior surface collectively defined by the polymer material and exposed portions of the metal particles, the boring further forming ridges with the polymer material that protrude above the metal particles and occupy at least about 8% of the area of the finished interior surface;

applying lubricant to one of the finished interior surface and a journal of the crankshaft;

inserting the journal into the bushing;

supporting the journal with the finished interior surface of the bushing;

positioning the bushing and the crankshaft within a housing of the compressor;

rotating the crankshaft journal relative to the bushing after the application of lubricant to one of the finished interior surface and the journal; and using hydrodynamic pressure developed between the journal and the bearing to at least partially fill the interstices with lubricant.

22. The method of claim 21, further comprising:

forming valleys with the polymer material on the finished interior surface following the boring step; and using hydrodynamic pressure developed between the journal and the bearing to at least partially fill the valleys with lubricant.

23. The method of claim 21, wherein forming ridges with the polymer material includes forming ridges that protrude above the metal particles by at least about 10 microns.

* * * * *